US011481658B2

(12) United States Patent
Gonzalez et al.

(10) Patent No.: US 11,481,658 B2
(45) Date of Patent: Oct. 25, 2022

(54) REAL-TIME MULTI-AGENT BDI ARCHITECTURE WITH AGENT MIGRATION AND METHODS THEREOF

(71) Applicant: PONTIFICIA UNIVERSIDAD JAVERIANA, Bogota (CO)

(72) Inventors: Alejandra Gonzalez, Bogota (CO); Enrique Gonzalez, Bogota (CO)

(73) Assignee: Pontificia Universidad Javeriana, Bogota (CO)

( * ) Notice: Subject to any disclaimer, the term of this patent is extended or adjusted under 35 U.S.C. 154(b) by 380 days.

(21) Appl. No.: 16/652,610

(22) PCT Filed: Oct. 1, 2018

(86) PCT No.: PCT/IB2018/057615
§ 371 (c)(1),
(2) Date: Mar. 31, 2020

(87) PCT Pub. No.: WO2019/064287
PCT Pub. Date: Apr. 4, 2019

(65) Prior Publication Data
US 2020/0234166 A1 Jul. 23, 2020

Related U.S. Application Data

(60) Provisional application No. 62/566,472, filed on Oct. 1, 2017.

(51) Int. Cl.
*G06N 7/00* (2006.01)
*G06N 20/00* (2019.01)
*G06N 5/04* (2006.01)

(52) U.S. Cl.
CPC ............ *G06N 7/005* (2013.01); *G06N 5/043* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,249,117 B2 | 7/2007 | Estes | |
| 9,213,525 B2 | 12/2015 | Majumdar et al. | |
| 10,063,501 B2 * | 8/2018 | Lane | H04L 51/56 |
| 10,296,587 B2 * | 5/2019 | Heck | G06F 40/35 |
| 10,585,957 B2 * | 3/2020 | Heck | G06F 16/9535 |

(Continued)

*Primary Examiner* — Anna C Deng
(74) *Attorney, Agent, or Firm* — The Morales Law Firm; Joseph L. Morales, Esq.

(57) ABSTRACT

Systems and methods for controlling and implementing a concurrent multi-agent BDI architecture to control complex systems in real time and exhibiting high parallelism. The system comprises BDI agent modules storing a BDI state of the whole system, an emotional and an internal the BDI agent modules and a world model. Each BDI agent module concurrently evaluates the activation of its potential goals and prioritizes its intentions. Each BDI agent module may be hardware-implemented, software-implemented or hybrid-domain-implemented, depending on whether they are executed on application-specific hardware, general purpose hardware or a combination thereof. The domain of each BDI agent might be migrated in real time during operation, optimizing resources and improving performance.

10 Claims, 5 Drawing Sheets

(56) References Cited

U.S. PATENT DOCUMENTS

| | | | |
|---|---|---|---|
| 2005/0197991 A1* | 9/2005 | Wray | G06N 5/025 |
| | | | 706/50 |
| 2006/0080103 A1* | 4/2006 | Van Breemen | G10H 1/0058 |
| | | | 707/E17.101 |
| 2007/0162405 A1* | 7/2007 | Parunak | G06N 3/006 |
| | | | 706/12 |
| 2011/0178978 A1 | 7/2011 | Parunak et al. | |
| 2017/0213127 A1* | 7/2017 | Duncan | G16B 50/30 |
| 2019/0065625 A1* | 2/2019 | Shinn | G06N 3/008 |
| 2019/0206400 A1* | 7/2019 | Cui | G05D 1/0016 |

* cited by examiner

REAL-TIME MULTI-AGENT BDI ARCHITECTURE WITH AGENT MIGRATION AND METHODS THEREOF

BACKGROUND OF THE INVENTION

1. Field of the Invention

The present invention relates to a control architecture based on the BDI paradigm for controlling complex system in real time and domain migration of BDI agent modules.

2. Description of the Prior Art

The development of complex applications in robotics, mobile computing, autonomous control and network management, among others, brings critical requirements that impose special challenges in the design and execution of the system's model. Some of these challenges are performance requirements (including real-time constraints), adaptability and interoperability. These requirements, in turn, demand scalable, modular, flexible and distributed systems which may display emergent properties.

The design of complex systems from requirements can be addressed by modeling these systems as autonomous entities (agents) which have mechanisms of communication among them. These structures constitute multi-agent systems (MAS) with important advantages over other approaches to model complex problems due to their dynamic nature, goal orientation, rationality, learning ability, scalability, modularity and flexibility.

The BDI (belief-desire-intention) architecture is a goal-oriented model that usually employs event-driven execution and presents both deliberative and reactive structures. The BDI agent model is built on a simplified view of human intelligence in which agents have their view of the world (beliefs), certain goals they wish to achieve (desires), and plans (intentions) to act on these desires using their accumulated experience. The structure of beliefs, desires and intentions provides a dynamic way to handle the goals of each agent.

Beliefs provide a model of the world to an agent thus indicating all interacting entities, all available resources, capacities, means, and its own internal state. They are modified by perception of the world (via sensors) and communication with other agents, and may evolve with time.

Desires are potential goals that can yield to action which have not yet materialized. The agent detects opportunities in the form of specific objectives, which are analyzed according to their consistency with the overall objective and cost-benefit tradeoffs.

Intentions are the projection of desires into the future, and usually become reality through the implementation of actions.

The state of an agent is associated to its beliefs, desires and intentions. In a dynamic world the multi-component state may change over time. Adaptation to world changes can be addressed in two ways: a) agent knows its objectives and desires (state of motivation) and b) recognizes changes in the world thus reconsidering decisions in lieu of the pursuit of its goals (deliberative status). In a dynamic process, reconsideration could change agent's desires and intentions and modify its beliefs.

Other models and implementations of the BDI architecture have been proposed and are directly related with context and application of the system. Some of these models are based on emotions of agents, character, and mental states. These approaches enhance rational behavior, but their implementations are complex and require specific design methodologies to handle a large number of variables and elements in the model. Other approximations of the BDI model are focused on social behavior projecting the social functionality in the structure of agents based on roles, hierarchical structures, management of transactional solutions among agents and resolution of coalitions and cooperative strategies among others.

However, concurrent processes of practical reasoning are not properly modeled in the aforementioned representations. The most representative concurrent processes are: a) detection of opportunities which is a reactive process, b) planning as deliberative process focused in the fulfillment of goals, c) reactive reconsideration and d) intention persistence, related to the achievement of the dynamic targets. Moreover, concurrency is a key element for hardware/software implementation of BDI agents for strengthening performance and reinforcing interoperability.

Implementation of concurrent processes must be developed explicitly from the partition analysis of software and hardware domains. Software implementation generates flexible BDI agents described by programs, facilitating design of agents, strengthening compliance with interoperability requirements and implementing concurrent processes emulating parallelism by threads on single processor platforms or modeling the real parallelism on multiprocessor or multicore platforms. On the other hand, the development of hardware agents enhances concurrency and performance requirements since the agents carry out their tasks in a parallel fashion thus, e.g., increase system's performance.

Co-design methods explore hardware/software combinations in a solution space formed by the two domains. Each possible solution characterized by particular parameters are evaluated with respect to some specification criteria. From these parameters a cost function is developed and serves to identify and select the most appropriate solution(s) according to specifications. Co-design methodologies leverage three elements. a) parametrized software and hardware libraries b) communication libraries which determine the best bus and interface protocols, and c) system resource analyzer, which considers system requirements such as maximum program size, processing capacity, memory capacity, etc.

The development of hybrid BDI agents with migration of domain requires a reformulation of the execution of the agent model. Agents should possess an effective architecture that can be implemented in hardware, software or in a hybrid form allowing migration among these three domains. Furthermore, MAS methodologies must be modified to include in their execution cycles, static domain segmentation, adopting co-design techniques, as well as the dynamic segmentation to support the migration process.

Furthermore, the majority of BDI approaches handle desires, intentions and beliefs in a simplistic manner. Current implementations are usually based on sequential algorithms that depart from the more realistic concurrent behavior. In these approaches, desires, beliefs and intentions are static elements that constitute a system.

Consequently, there is the need in the art of a methodology that dynamically employs multi-agent concurrent BDI architectures to efficiently control complex system in real time and that relies in co-design techniques to allow for domain migration during operation. This would involve instantiation of goals to which agents are committed, and achievability of actions as function of resources and capabilities.

SUMMARY

A system (100) that controls complex systems in real time by employing an improved BDI architecture is herein disclosed. The system (100) comprises one or more output media (400) and input media (500), one or more BDI agent modules (200) and a communications channel (300) that allows the one or more BDI agent modules (200) to concurrently communicate with one another. Each of the one or more BDI agent modules (200) includes:

- a beliefs manager module (210) comprising one or more registers (211) that store the BDI state (901), emotional state (902), internal state (903) and world model (904) of the BDI agent module (200)
- a goal manager module (220) comprising one or more registers (221) that store the desire tasks (911) and intention tasks (912) of the BDI agent module (200), a goal analyzer module (222) which evaluates the potential goals and updates the desire tasks (911), and a deliberation engine module (223) which prioritizes the outputs of the goal analyzer module (222) and updates the intention tasks (221)
- a means-end manager (230) that concurrently controls the one or more output media (400) in real time depending on the instantaneous state (901, 902, 903, 904) of the BDI agent module (200).

The system (100) is further characterized because each of the one or more BDI agent modules (200) may be implemented in application-specific hardware, general purpose hardware or hybrid-domain hardware, and the domain of each of the one or more BDI agent modules (200) may be migrated during operation.

The system (100) according to the present invention allows for real-time control of generalized complex systems by concurrently measuring the surroundings of the complex system, updating the state of each of the one or more BDI agent modules (200), prioritizing the intention tasks (912) depending on a previous update of the desire tasks (911) and changing its environment with the one or more output media (400). Consequently, the system (100) hereby described achieves high parallelism.

A method (2000) to control the system (100) is also herein disclosed. The method (2000) comprises: sharing or communicating (2050) information between the one or more BDI agent modules (200) via the communication channel (300), sensing (2100) the surrounding environment of the system (100) via the one or more input media (500), and updating (2200) one or more BDI agent modules (200). Given that the complex system is subjected to various time-dependent stimuli and is prone to undergoing changes, the control system (200) needs to be constantly updating. Hence, the stages of the method (2000) are repeated during operation and are executed concurrently to allow for high parallelism.

Another aspect of the invention relates to a method (1000) for implementing the system (100) herein revealed. This implementation is accomplished by determining the domain of each BDI agent module (200) and re-determining, during operation, the optimal domain for each. Each BDI agent module (200) may be in one of three domains: hardware-implemented, software-implemented, and hybrid-domain implemented. Hardware-implemented BDI agent modules (200) are executed on application-specific hardware, software-implemented BDI agent modules (200) are executed on general purpose hardware, and hybrid-domain-implemented BDI agent modules (200) are executed on a combination of application-specific hardware and general-purpose hardware.

The method (1000) described comprises: defining (1100) the domain of each of one or more BDI agent modules (200), mapping (1200) each of the one or more BDI agent modules (200) into its respective hardware, concurrently and, during operation, repeatedly, updating (2200) one or more of the BDI agent modules (200). One embodiment of the present invention reveals that the method (1000) further comprises the step of re-mapping (1400) each of the one or more BDI agent modules (200), thus migrating its domain in real time which entails a resource optimization and an improvement in the system's performance, adaptability and interoperability.

The present invention involves the concept of "current state" which refers to the instantaneous conditions that define (and affect) agent's decisions. Changes of state or context are perceived as goals-oriented perceptions and seek to obtain information about the environment and other agents to make more effective decisions.

DETAILED DESCRIPTION OF THE PREFERRED EMBODIMENTS

Figure 1:
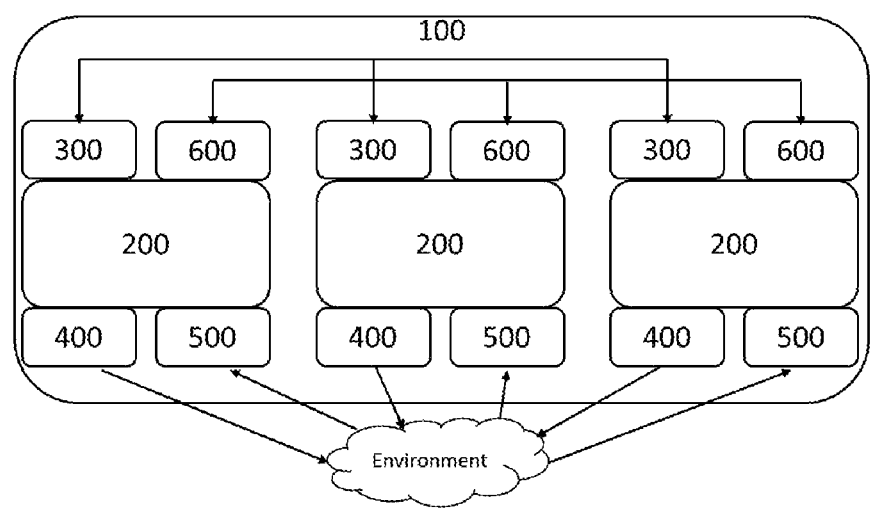
FIG. 1 shows a general diagram of the system (100) according to the present invention.

The present disclosure provides systems and methods for modelling complex systems based on concurrent BDI architectures with hybrid hardware/software agents. The approach focuses on the requirements of the complex system such as performance, interoperability and adaptability from the perspective of agents' domain of implementation (configurable hardware, software and/or hybrid). The present invention addresses these requirements through the use of domain migration. Thus, BDI agents can be dynamically implemented in software, hardware or hybrid-domain as needed to improve certain requirements such as the system's performance). Moreover, the model easily incorporates agents' mental processes and natural parallelisms in the evaluation of decision making cycle. Consequently, the present invention allows system models that are modular, scalable, concurrent and interoperable.

One aspect invention relates to a system (100) for implementing a concurrent multi-agent BDI architecture to control complex systems in real time and exhibiting high parallelism. The system (100) is characterized for comprising one or more BDI agent modules (200) each storing a BDI state (901) of the whole system, an emotional state (902) and an internal state (903) of itself, and a world model (904). Each BDI agent module (200) includes a goal manager module (220) which further comprises a goal analyzer module (222) concurrently evaluating the activation of potential goals of the BDI agent module (200) and a deliberation engine module (223) implementing a mediator mechanism to prioritize and output, in real time, the intentions of each BDI agent module (200). The BDI agents (200) according to the present invention may be hardware-implemented, software-implemented or hybrid-domain-implemented, depending on whether they are executed on application-specific hardware, general purpose hardware or a combination thereof.

The system (100) according to the present invention is configured to implement a concurrent multi-agent BDI architecture to control complex systems in real time, exhibiting high parallelism. The system (100) comprises one or more input media (500) and one or more output media (400) through which it communicates with the complex system.

FIG. 1 shows a general diagram of the system (100). The one or more BDI agent modules (200) are interconnected to one another via the communications channel (300), and connected to the environment via the output media (400) and the input media (500)

According to a preferred embodiment, the one or more input media (500) are one or more sensors with which the system (100) measures signals from the complex system. According to a preferred embodiment, the one or more output media (400) are one or more actuators with which the system (100) changes one or more state variables of the complex system.

Figure 2:
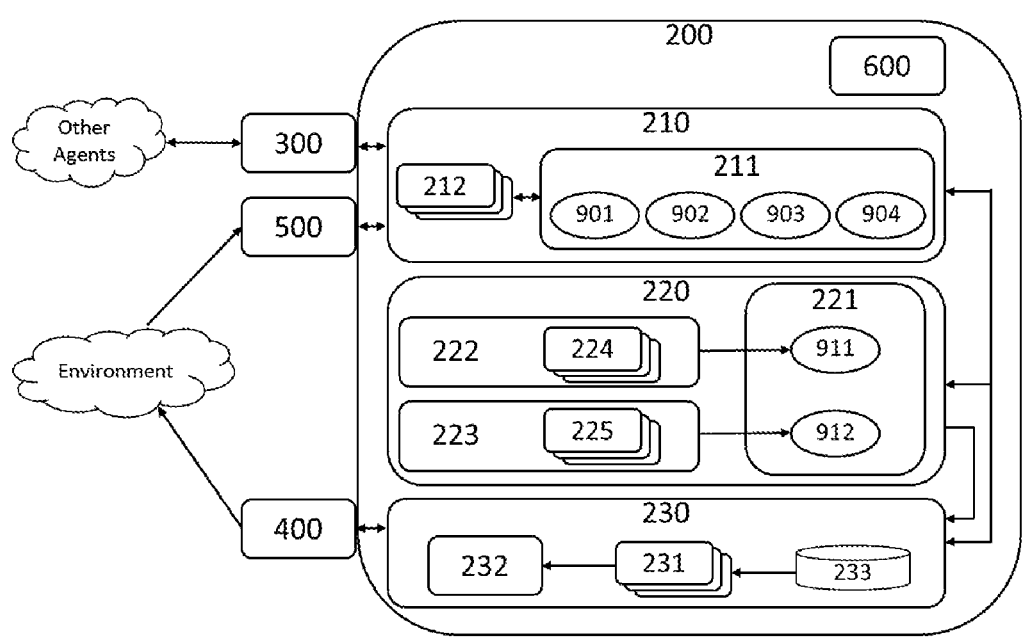
FIG. 2 shows a general diagram of the BDI agent modules (200) according to the present invention.

FIG. 2 shows a general diagram of a BDI agent module (200), evincing the different components it comprises. Each of the one or more BDI agent modules (200) of the system (100) hereby revealed includes three internal managers (belief, goals, and mean and ends) that instantiate objectives at different levels of abstraction during the evolution of desires to intentions, modulated by the beliefs and subsequently a decision and action cycle. Each of the beliefs manager module (210), goal manager module (220) and a means-end manager module (230) is responsible of a different task during the operation of the BDI agent module (200).

The beliefs manager module (210) is in charge of managing the beliefs of the BDI agent module (200) by controlling the life cycle of the agent's beliefs. It includes one or more registers (211) that store the BDI state (901), emotional state (902), internal state (903) and world model (904) of the respective BDI agent module (200). According to a preferred embodiment of the invention, at least one of the BDI state (901), the emotional state (902), the internal state (903) and the world model (904) of the BDI agent modules (200) is stored in a different register (211) than the others. According to another embodiment of the invention, the BDI state (901), the emotional state (902), the internal state (903) and the world model (904) of the BDI agent modules (200) are all stored in the same register (211).

To control and update the one or more registers (211) that store the state (901, 902, 903, 904) of each BDI agent module (200), the beliefs manager module (210) may further comprise a beliefs updater module (212). The beliefs updater module is application-specific hardware, general-purpose hardware or a combination thereof configured to read the state (901, 902, 903, 904) of each BDI agent module (200) and re-write the one or more registers (211) depending on its own state (901, 902, 903, 904), the signals measured with the one or more input media (500) and the state (901, 902, 903, 904) of the other BDI agent modules (200) of the system (100).

The beliefs manager (211) executes a cycle in which four states might be identified: merging, update, inference and death. This cycle keeps consistency among beliefs, incorporate information from beliefs to BDI mental processes, and update possible mechanisms of learning.

Additionally, a cycle of attention (update of the beliefs manager module (211)) can be identified. This process occurs when the agent acts exclusively to feed the beliefs manager module (211) seeking information from the environment and from other BDI agent modules (200). It occurs when the agent is not busy fulfilling its goal. This cycle of attention can be modeled as a reflex action or as an objective which is processed in the scheme of goal management.

The goal manager module (220) manages the desire tasks (911) of the BDI agent module (200) which evolve into its intention tasks (912). The desire-intention instantiation is a dynamic state process in which goals are detected, assessed, activated or disposed. At the end, active desire tasks (911) are established as intention tasks (912).

The goal manager module (220) includes one or more registers (221) that store one or more desire tasks (911) and one or more intention tasks (912) of the BDI agent module (200), a goal analyzer module (222) that includes a set of finite state machines (224) operating in parallel and evaluating the activation of potential goals, whose output updates in real time the desire tasks (911) in the one or more registers (221), and a deliberation engine module (223) that includes a set of finite state machines (225) operating in parallel and implementing a mediator mechanism to prioritize the output states of the goal analyzer module (222), whose output updates in real time the intention tasks (912) in the one or more registers (221).

According to a preferred embodiment, the desire tasks (911) and the intention tasks (912) are stored in different of the one or more registers (221). According to another embodiment of the invention, the desire tasks (911) and the intention tasks (912) are stored in the same register (221).

The means-end manager module (230) controls the actions of the BDI agent module (200) depending on its desire tasks (911) and intention tasks (912). The actions of the BDI agent module (200) are conveyed by the one or more output media (400). The means-end manager module (230) comprises one or more means-end reasoner modules (231) that concurrently control the one or more output media (400) in real time depending on the state (901, 902, 903, 904) of the BDI agent module (200). The means-end reasoner modules (231) are configured to read a plan library database (233) and select the plan stored therein which satisfies the currently active intention tasks (912). The control of the one or more output media (400) is done via an action executor module (232) which transmits the necessary signals to achieve the active intention tasks (912).

According to the present invention, the system (100) also comprises a communication channel (300) that interconnects the one or more BDI agent modules (200), the output media (400) and the input media (500) to allow for concurrent communication between them. The communication channel (300) is a physical data bus, a wireless communication channel or a combination of these.

It is an essential feature of the system (100) according to the present invention that the various BDI agent modules (200) can have different domains, i.e., the one or more BDI agent modules (200) are hardware-implemented, software-implemented, or hybrid-domain-implemented. hardware-implemented BDI agent modules (200) are executed on application-specific hardware, software-implemented BDI agent modules (200) are executed on general purpose hardware, and hybrid-domain-implemented BDI agent modules (200) are executed on a combination of application-specific hardware and general-purpose hardware.

In the context of the present invention, application-specific hardware refers to specific electronic circuits (either integrated or built by connecting discrete components) which have a define purpose and execute a particular action. Additionally, application-specific hardware can be a digital circuit implemented using, for instance, FPGAs, thus allowing for adaptability and evolution of the circuit. On the other hand, general purpose hardware refers to electronic circuits that execute a series of software- or firmware-defined instructions and do not have a specific application. Processors are among the most common examples of general purpose hardware. Moreover, the domain of any given BDI agent module (200) might change over time.

Using hardware-domain agents ensures that the goal evaluation is concurrent and parallel. Thus, the system is extensible with new goals. This capacity of expansion is achieved with a low cost in logical elements and with a (approximately) constant time. Latency in this case would be associated with the longest and costly path in time. On the other hand, software-domain agents can be used for applications having few goals, on the order of hundreds of goals. For larger number of goals, it is convenient to use a hybrid implementation (e.g., FPGA+software).

An important factor in the implementation is the data transfer channel, which must be fast enough in order not to increase the latency for complete system execution. According to a preferred embodiment of the invention, the system (100) has a shared memory between the hardware-domain and the software-domain BDI agent modules (200). Another preferred embodiment includes a processor embedded in the FPGA (or application-specific hardware) that implements the hardware-domain BDI agent modules (200).

According to a preferred embodiment of the invention, the system (100) further comprises a re-mapping module (600) to change the domain of the one or more BDI agent modules (200) between hardware-implemented, software-implemented and hybrid-domain-implemented. The re-mapping module (600) might run while the system is operating for dynamically migrating the agent's domain. This module can be unique for the system (100) or distributed between the BDI agent modules (200). A general diagram of the system (100) showing the distributed deployment of the re-mapping module (600) is depicted in FIG. 1.

Figure 3:
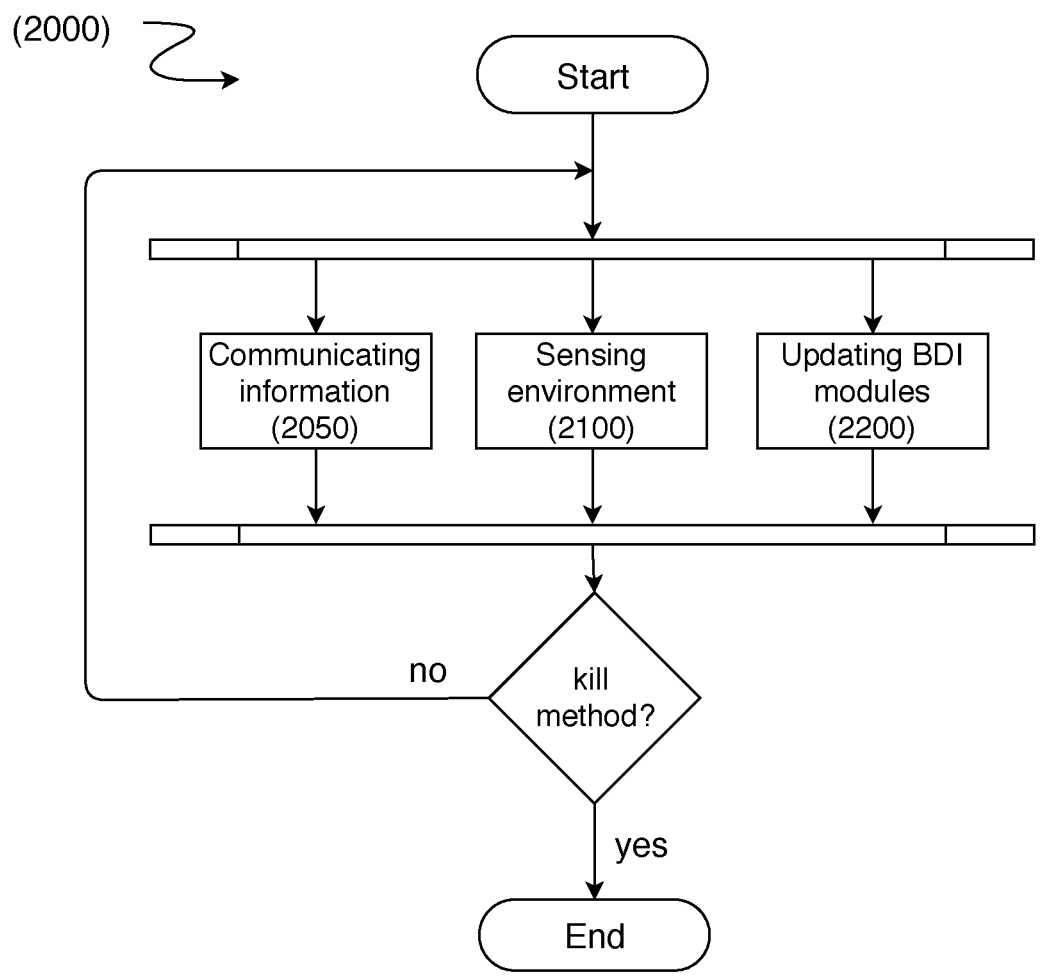
FIG. 3 shows a flow diagram of the method (2000) to control the system (100) according to the present invention.

The present invention also relates to a method (2000) to control, with high parallelism and in real time, the system (100) herein revealed. The method (2000) comprises the steps of concurrently communicating (2050) information between the one or more BDI agent modules (200), sensing (2100) the surroundings of the system (100), and updating (2200) the state of each BDI agent module (200). These steps are repeated during operation of the system (100), thus perceiving and adjusting to the evolution of the complex system over time. A flow diagram of the method (2000) to control the system (100) can be seen in FIG. 3.

According to the present invention, the step of concurrently updating (2200) one or more of the BDI agent modules (200) comprises: updating (2201) the world model (904) in the one or more registers (211) based on the data acquired from communicating (2100) information between one or more of the BDI agent modules (200) and from sensing (2200) the surrounding environment, updating (2202) the internal state (903) in the one or more registers (211) based on the internal state (901, 902, 903, 904) of the BDI agent module (200), updating (2203) the emotional state (902) based on information related to the active intention tasks (912) being performed by the one or more BDI agent modules (200), reading (2204) the one or more registers (221) to identify the active desire tasks (911) and the prioritized intention tasks (912), writing (2205) on the register (211) the updated BDI state (901), executing (2206) the set of finite state machines (224) to update the desire tasks (911) and executing the set of finite state machines (225) to update the prioritized intention tasks (912) in the one or more registers (221), writing (2207) on the register (221) the updated desire tasks (911) and prioritized intention tasks (912), executing (2208) from the plan library database (233) a plan that accomplishes each of the prioritized intention tasks (912), and sending (2209), from the action executor (232), signals to the one or more output media (400) through the control units.

The beliefs manager (211) executes a cycle in which four states might be identified: merging, update, inference and death. This cycle keeps consistency among beliefs, incorporates information from beliefs to BDI mental processes, and updates possible mechanisms of learning.

In a given scenario a BDI agent (200) may face multiple specific goals at the same time; hence it must manage these objectives concurrently to determine which will determine its actions. The goal manager module (220) implements a prioritization paradigm to consider these diverse goals and analyze them in a parallel and concurrent fashion. The prioritization paradigm is carried out during the steps of reading (2204), executing (2206) and writing (2207) o the method (2000). This is modeled through a system of states associated to goals represented by the finite state machines (224, 225). Events are triggered by input media (500) and communication channels (300), and in turn they make goals evolve among available states via the output media (400).

The prioritization paradigm according to the present invention includes a hierarchical model to determine the relevance of the different intention tasks (912) of each BDI agent module (200). This hierarchical model is executed by the deliberation engine module (223) whose output updates in real time the prioritized intention tasks (912) stored in the one or more registers (211). The hierarchical model determines the degree of importance of every active intention task (912) and assigns it to a queue. Plans from the plan library database (223) are executed in the order their corresponding intention tasks (912) are assigned to the queue. The hierarchical model includes at least two categories of different priority wherein the several goals are classified. According to a particular and non-limiting embodiment of the invention, the hierarchical model considers six categories of specific goals: attention, requirements, needs, opportunities, obligations and survival tasks.

Attention goals are related to basic activities of the agent; thus, they are associated with actions concerned with basic perceptual and operating functionalities. Normally, these goals are selected when there are no other useful things to do. As an example, in a soccer game when the agent is not involved in the actions near the ball, it should at least look in an active way for the ball and the positions of the other players. These usually represent the lowest level in priority.

Requirements are goals associated with the essential capabilities of the agent. They are context requests to comply with the general goal for which the agent was intended. They may usually involve some combination of resources and skills to be fulfilled. In the soccer game example, a requirement goal could be the need to run faster to reach the ball.

Needs are goals derived from the metacognition and self-critical thinking from a rational agent. BDI agents assess whether the overall system's objective is being fulfilled, otherwise it triggers a process of restructuring its goals. For instance, a soccer player (BDI agent) that is not reaching the ball realizes that he needs to increase his speed.

Opportunities are events or circumstances that arise in the context of the BDI agent as time progresses, and the BDI agent should make an effort to take advantage of them. For example, a soccer player (BDI agent) will leverage his opponent's mistakes, his position in the field and his proximity to the ball to take possession of the ball.

Obligations arise from the nature of the agent and its context. An agent can be a new parent and then must act in a consistent way with its new role; the individual must balance their decisions even if they are not consistent or do not contribute directly to the overall goal. In this sense goals generated by obligation will affect directly the decision-making processes. For instance, a soccer player has to prevent hitting other players.

Survival is a category of goals essential to the BDI agent, since they are focused on its own care and protection. For example, an individual in a society (agent) has to obtain minimum resources (food, rest, etc.) to survive or take care of its own health. If the BDI agent lacks these elements it will be unable to pursue its overall goal. Hence, this is usually the top priority in the hierarchical model.

Figure 4:
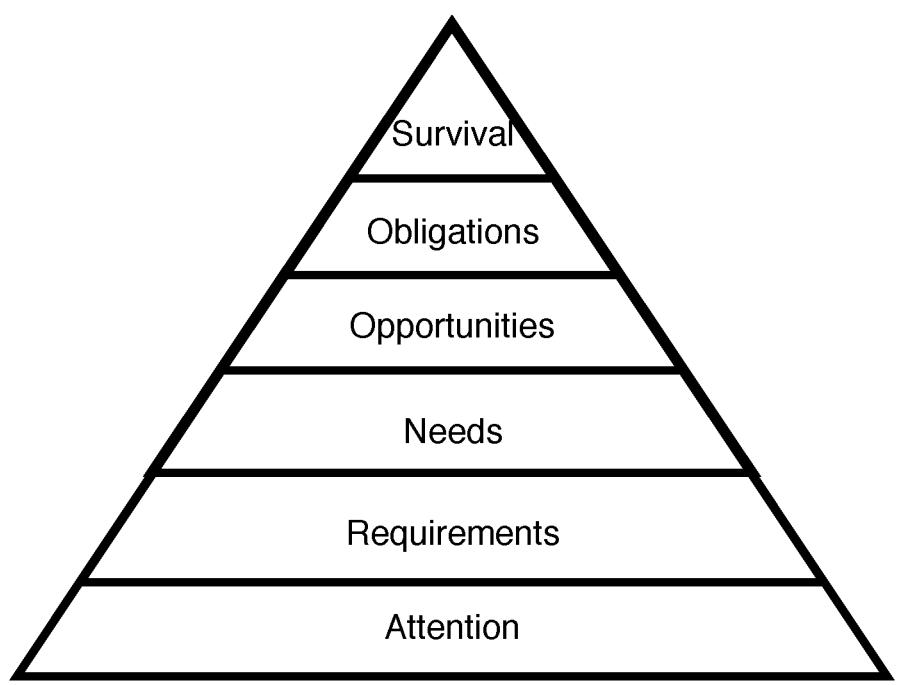
FIG. 4 shows a diagram of the hierarchical model to prioritize intention tasks (912) according to a preferred embodiment of the present invention.

FIG. 4 shows a diagram of the hierarchical model to prioritize intention tasks (912) according to an embodiment of the present invention. It can be seen that survival tasks have the highest priority, followed by obligations, opportunities, needs, requirements and attention goals.

All goals start in a state of a potential goal. Subsequently, to reach the state of active goal, specific objectives are filtered and classified into one of the different hierarchical categories. In a particular embodiment, these hierarchical categories are: attention, requirements, needs, obligations, opportunities and elements of survival. If a goal does not enter into any of these categories it will remain as a potential goal. Subsequently, each active goal is evaluated in parallel through a valuation of plausibility. As herein defined, a plausible goal is a goal that is legal in the context of the agent. The transition between active goal and plausible goal is generated by applying a function of allowability that has as parameter the threshold of plausibility for the specific application.

The plausible goals are evaluated again by a filter of feasibility based on the capabilities of the agent. The filter is based on a function that calculates if the agent has the skills and resources to meet a specific goal. In the event that the agent lacks these requirements, the goal will not be viable and will return to the status of potential goal. Viable goals are evaluated recursively for plausibility and feasibility as a cleaning mechanism (garbage collector), which allows adaptation to the changes in context; i.e., generating capacity of adaptation to a change of overall goal. In some cases, the viable goals will have a transition to potential goal. Viable goals are evaluated by a contribution arbiter. This arbiter has a hierarchy established with respect to the categories of goals, so that some goals take precedence over others. Goals categories can be seen as organized in a pyramid, the ones with high priority at the top and the ones with low priority at the bottom.

In case a given BDI agent (200) faces a decision between goals that lay in the same category of goals, the concept of "contribution" becomes relevant. Contribution refers to the weighting of each specific objective as their impact on the overall goal for which the agent has been committed. This value will indicate the order in which to execute goals that are in the same level of the pyramid.

The process in which a dominant goal is replaced with a new one and sent to the state of potential goal is called expropriation. The process of replacing a feasible goal for a dominant goal is called activation. Expropriation may result from various causes, for example if the current overall goal is already fulfilled. Each BDI agent (200) must then synchronize with the new overall goal.

Another aspect of the invention relates to a method (1000) for implementing the system (100) herein revealed and migrating, in real time and during execution, the domain in which the one or more BDI agents (200) are implemented. The method (1000) allows for mapping and re-mapping during operation of each BDI agent module (200) into application-specific hardware, general purpose hardware or a combination of these, depending on its chosen domain.

The method (1000) to implement the system (100) comprises the steps of: defining (1100) the domain of each of one or more BDI agent modules (200), wherein the one or more BDI agent modules (200) are hardware-implemented, software-implemented, or hybrid-domain-implemented; mapping (1200) each of the one or more BDI agent modules (200) into application-specific hardware if they are hardware-implemented, into general-purpose hardware if they are software-implemented, and into a combination of application-specific hardware and general-purpose hardware if they are hybrid-domain-implemented; and concurrently updating (2200) one or more BDI agent modules (200). The step of concurrently updating (2200) the BDI agent modules (200) is constantly repeated during operation of the system (100).

Figure 5:
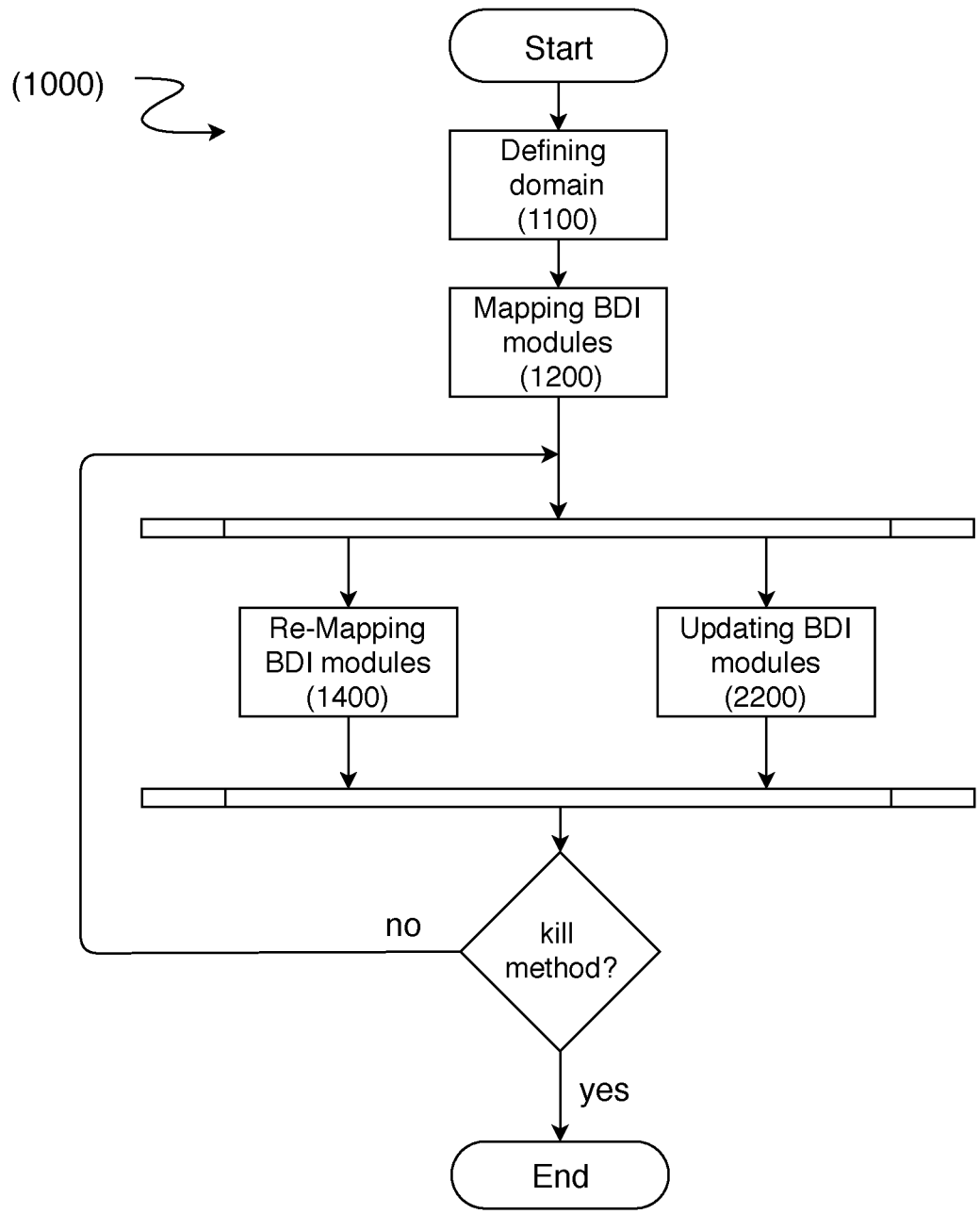
FIG. 5 shows a flow diagram of the method (1000) to implement the system (100) according to a preferred embodiment of the present invention.

In a preferred embodiment, the method (1000) further comprises re-mapping (1400), during operation, each of the one or more BDI agent modules (200) so as to migrate their domain depending on the updated state (901, 920, 903, 904) of the BDI agent module (200), the updated desire tasks (911) and updated intention tasks (912). Furthermore, according to this preferred embodiment, the re-mapping (1400) step is also repeated during operation, hence allowing for real-time adaptability and interoperability of the system, which entails resources optimization and performance improvement. A flow diagram of a preferred embodiment of the method (1000) to implement the system (100) can be seen in FIG. 5.

The invention claimed is:

1. A system that implements a concurrent multi-agent belief-desire-intention (BDI) architecture to control a complex system in real time, the system comprising:
   one or more processors;
   one or more output media, wherein the one or more output media are one or more actuators;
   one or more input media;
   one or more BDI agent modules including:
   a beliefs manager module, wherein the beliefs manager module further includes:
   one or more state registers that store a BDI state, an emotional state, an internal state and a world model of a respective BDI agent module; and
   a beliefs updater module to control and update the one or more state registers;
   a goal manager module, wherein the goal manager module further includes:
   one or more task registers that store one or more desire tasks and one or more intention tasks of the respective BDI agent module;

a goal analyzer module that includes a first set of finite state machines operating in parallel and evaluating an activation of potential goals, whose output updates in real time the desire tasks in the one or more task registers; and a deliberation engine module that includes a second set of finite state machines operating in parallel and implementing a mediator mechanism to prioritize output states of the goal analyzer module, whose output updates in real time the one or more intention tasks in the one or more task registers; and a means-ends manager module wherein the means-end manager module further includes:

one or more means-end reasoner modules that concurrently control the one or more actuators in real time depending on a state of the respective BDI agent module via an action executor module, each means-end reasoner module operating over a set of instructions stored in a plan library database; and a communication channel that interconnects the one or more BDI agent modules to allow for concurrent communication between them;

wherein:

the one or more output media and the one or more input media allow connection between the system and a surrounding environment of the system;

the one or more BDI agent modules are hardware-implemented, software-implemented, or hybrid-domain-implemented;

hardware-implemented BDI agent modules are executed on application-specific hardware;

software-implemented BDI agent modules are executed on general purpose hardware; and hybrid-domain-implemented BDI agent modules are executed on a combination of application-specific hardware and general-purpose hardware.

2. The system according to claim 1, wherein the one or more output media are one or more actuators with which the system changes one or more state variables of the complex system.

3. The system according to claim 1, wherein the one or more input media are one or more sensors with which the system reads signals from the complex system.

4. The system according to claim 1, wherein each of the BDI state, the emotional state, the internal state and the world model (904) of the BDI agent modules is stored in a different state register of the one or more state registers.

5. The system according to claim 1, wherein for each of the one or more intention tasks there is one or more instructions stored a plan retrieved from in the plan library database.

6. A method for controlling the system according to claim 1, the method comprising:

communicating information between the one or more of the BDI agent modules via the communication channel;

sensing the surrounding environment of the system via one or more sensors;

updating the one or more BDI agent modules, wherein updating a BDI agent module comprises:

updating the world model in the one or more state registers based on data acquired from communicating information between the one or more BDI agent modules and sensing the surrounding environment of the system;

updating the internal state in the one or more state registers based on the internal state of the BDI agent module;

updating the emotional state based on information related to active intention tasks being performed by the one or more BDI agent modules;

reading the one or more state registers to identify active desire tasks and prioritized intention tasks;

writing on the one or more state registers an updated BDI state;

executing the first set of finite state machines to update the active desire tasks and executing the second set of finite state machines to update the prioritized intention tasks in the one or more task registers;

writing on the one or more task registers updated active desire tasks and the prioritized intention tasks;

executing from the plan library database a plan that accomplishes each of the prioritized intention tasks; and sending, from the action executor module, signals to the one or more actuators through control units;

wherein:

stages of the method are executed concurrently to allow for high parallelism; and the stages of the method are repeated during an operation of the system.

7. The method according to claim 6, wherein writing on the one or more task register the updated prioritized intention tasks is done by applying expropriation policies.

8. A method to implement the system according to claim 1, the method comprising:

defining a domain of each of the one or more BDI agent modules, wherein the one or more BDI agent modules are hardware-implemented, software-implemented, or hybrid-domain-implemented;

mapping each of the one or more BDI agent modules into application-specific hardware if they are hardware-implemented, into general-purpose hardware if they are software-implemented, and into a combination of application-specific hardware and general-purpose hardware if they are hybrid-domain-implemented; and during an operation of the complex system, concurrently updating the one or more BDI agent modules, wherein updating a BDI agent module comprises:

updating the world model in the one or more state registers based on data acquired from communicating information between the one or more of the BDI agent modules and from sensing the surrounding environment of the system;

updating the internal state in the one or more state registers based on the internal state of the BDI agent module;

updating the emotional state based on information related to active intention tasks being performed by the one or more BDI agent modules;

reading the one or more task registers to identify active desire tasks and prioritized intention tasks;

writing on the one or more state registers an updated BDI state;

executing the first set of finite state machines to update the active desire tasks and executing the second set of finite state machines to update the prioritized intention tasks in the one or more tasks registers;

writing on the one or more task registers the updated active desire tasks and the prioritized intention tasks;

executing from the plan library database a plan that accomplishes each of the prioritized intention tasks; and sending, from the action executor module, signals to the one or more actuators through control units;

wherein:
the updating the one or more BDI agent modules is repeated during the operation of the complex system.

9. A method to implement the system according to claim 1, the method comprising:
defining a domain of each of the one or more BDI agent modules, wherein the one or more BDI agent modules are hardware-implemented, software-implemented, or hybrid-domain-implemented;
mapping each of the one or more BDI agent modules into application-specific hardware if they are hardware-implemented, into general-purpose hardware if they are software-implemented, and into a combination of application-specific hardware and general-purpose hardware if they are hybrid-domain-implemented;
during an operation of the complex system, concurrently updating the one or more BDI agent modules, wherein updating a BDI agent module comprises:
updating the world model in the one or more state registers based on data acquired from communicating information between the one or more of the BDI agent modules and from sensing the surrounding environment;
updating the internal state in the one or more state registers based on the internal state of the BDI agent module;
updating the emotional state based on information related to active intention tasks being performed by the one or more BDI agent modules;
reading the one or more task registers to identify active desire tasks and prioritized intention tasks;
writing on the one or more state registers an updated BDI state;
executing the first set of finite state machines to update the active desire tasks and executing the second set of finite state machines to update the prioritized intention tasks in the one or more task registers;
writing on the one or more tasks the updated active desire tasks and prioritized intention tasks;
executing from the plan library database a plan that accomplishes each of the prioritized intention tasks; and
sending, from the action executor module, signals to the one or more actuators through control units; and
during the operation of the complex system, re-mapping via a re-mapping module each of the one or more BDI agent modules to migrate their domain depending on the updated state of the BDI agent module, the updated desire tasks and updated intention tasks;
wherein:
the updating the BDI agent module and re-mapping steps are repeated during the operation of the complex system.

10. A system that implements a concurrent multi-agent belief-desire-intention (BDI) architecture to control complex systems in real time, the system comprising:
one or more processors;
one or more output media wherein the one or more output media are one or more actuators;
one or more input media;
one or more BDI agent modules including:
a beliefs manager module, wherein the beliefs manager module further includes:
one or more state registers that store a BDI state, an emotional state, an internal state and a world model of a respective BDI agent module; and
a beliefs updater module to control and update the one or more state registers;
a goal manager module, wherein the goal manager module further includes:
one or more task registers that store one or more desire tasks and one or more intention tasks of the respective BDI agent module;
a goal analyzer module that includes a first set of finite state machines operating in parallel and evaluating an activation of potential goals, whose output updates in real time the desire tasks in the task one or more registers; and
a deliberation engine module that includes a second set of finite state machines operating in parallel and implementing a mediator mechanism to prioritize output states of the goal analyzer module, whose output updates in real time the one or more intention tasks in the one or more task registers; and
a means-ends manager module, wherein the means-end manager module further includes:
one or more means-end reasoner modules that concurrently control the one or more actuators in real time depending on a state of the respective BDI agent module via an action executor module, each means-end reasoner module operating over a set of instructions stored in a plan library database; and
a communication channel that interconnects the one or more BDI agent modules to allow for concurrent communication between them; and
a re-mapping module to change a domain of the one or more BDI agent modules between hardware-implemented, software-implemented and hybrid-domain-implemented;
wherein:
the one or more output media and the one or more input media allow connection between the system and a surrounding environment of the system;
the one or more BDI agent modules are hardware-implemented, software-implemented, or hybrid-domain-implemented;
hardware-implemented BDI agent modules are executed on application-specific hardware;
software-implemented BDI agent modules are executed on general purpose hardware; and
hybrid-domain-implemented BDI agent modules are executed on a combination of application-specific hardware and general-purpose hardware.

* * * * *